United States Patent
Smith

(10) Patent No.: US 8,601,195 B2
(45) Date of Patent: Dec. 3, 2013

(54) PRIMARY DISPLAY WITH SELECTIVELY AUTONOMOUS SECONDARY DISPLAY MODULES

(75) Inventor: Dana S. Smith, Dana Point, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 157 days.

(21) Appl. No.: 13/168,940

(22) Filed: Jun. 25, 2011

(65) Prior Publication Data

US 2012/0331200 A1  Dec. 27, 2012

(51) Int. Cl.
*G06F 13/00* (2006.01)
*G06F 1/16* (2006.01)

(52) U.S. Cl.
CPC .................................. *G06F 1/1632* (2013.01)
USPC .......................................................... 710/303

(58) Field of Classification Search
USPC .................................................. 710/300–317
See application file for complete search history.

(56) References Cited

U.S. PATENT DOCUMENTS

| | | | |
|---|---|---|---|
| 5,850,209 A | 12/1998 | Lemke et al. | |
| 6,035,350 A | 3/2000 | Swamy et al. | |
| 6,166,734 A | 12/2000 | Nahi et al. | |
| 6,285,757 B1 | 9/2001 | Carroll et al. | |
| 6,665,741 B1 | 12/2003 | Bronson | |
| 6,784,855 B2 | 8/2004 | Matthews et al. | |
| 7,028,103 B2 | 4/2006 | Martinez et al. | |
| 7,086,080 B2 | 8/2006 | Martinez et al. | |
| 7,086,081 B2 | 8/2006 | Martinez et al. | |
| 7,231,198 B2 | 6/2007 | Loughran | |
| 7,248,231 B2 | 7/2007 | Hurley et al. | |
| 7,312,813 B1 | 12/2007 | Heinonen | |
| 7,480,746 B2 | 1/2009 | Simon et al. | |
| 7,508,412 B2 | 3/2009 | Liu | |
| 2002/0093531 A1 | 7/2002 | Barile | |
| 2002/0113994 A1 | 8/2002 | Smith et al. | |
| 2003/0218597 A1 | 11/2003 | Hodzic et al. | |
| 2004/0032400 A1 | 2/2004 | Freeman et al. | |
| 2004/0168118 A1 | 8/2004 | Wong et al. | |
| 2005/0030255 A1 | 2/2005 | Chiu et al. | |
| 2005/0253773 A1* | 11/2005 | Sekiguchi | 345/1.1 |
| 2005/0278642 A1 | 12/2005 | Chang et al. | |
| 2007/0168593 A1* | 7/2007 | Montag et al. | 710/303 |

(Continued)

FOREIGN PATENT DOCUMENTS

| | | |
|---|---|---|
| WO | WO0233687 | 4/2002 |
| WO | WO02082796 | 10/2002 |

(Continued)

*Primary Examiner* — Raymond Phan
(74) *Attorney, Agent, or Firm* — Law Office of Gerald Maliszewski; Gerald Maliszewski

(57) ABSTRACT

A multi-function display is provided with selectively autonomous secondary modules. A primary device is made up of a central display controller for determining display functions, and at least one docking port. Each docking port selectively connects a SDD to the primary device mechanically, and electrically connects a docked SDD to the central display controller. Each SDD includes a local display screen, and a local display controller for determining local display functions. Each SDD includes a docking port for selectively interfacing to a primary device docking port, and also includes a governor module. The governor module has an interface to determine if the SDD is docked to the primary device. The governor module permits the central display controller to determine local display functions in response to the SDD being docked with the primary device, or permits the local display controller to determine local display functions in response to the SDD not being docked.

23 Claims, 11 Drawing Sheets

(56) References Cited

U.S. PATENT DOCUMENTS

| | | | |
|---|---|---|---|
| 2007/0198760 A1* | 8/2007 | Han | 710/303 |
| 2007/0233929 A1* | 10/2007 | Baik | 710/303 |
| 2008/0098450 A1 | 4/2008 | Wu et al. | |
| 2008/0304688 A1* | 12/2008 | Kumar | 381/370 |
| 2010/0250816 A1* | 9/2010 | Collopy et al. | 710/303 |
| 2012/0030393 A1* | 2/2012 | Ganesh et al. | 710/303 |
| 2012/0117290 A1* | 5/2012 | Sirpal et al. | 710/303 |
| 2012/0176746 A1* | 7/2012 | Chen et al. | 361/679.55 |

FOREIGN PATENT DOCUMENTS

| | | |
|---|---|---|
| WO | WO03026252 | 3/2003 |
| WO | WO2005092456 | 10/2005 |
| WO | WO2005099263 | 10/2005 |
| WO | WO2005104521 | 11/2005 |
| WO | WO 2007034457 | 3/2007 |
| WO | WO 2007131067 | 11/2007 |
| WO | WO 2008124697 | 10/2008 |

* cited by examiner

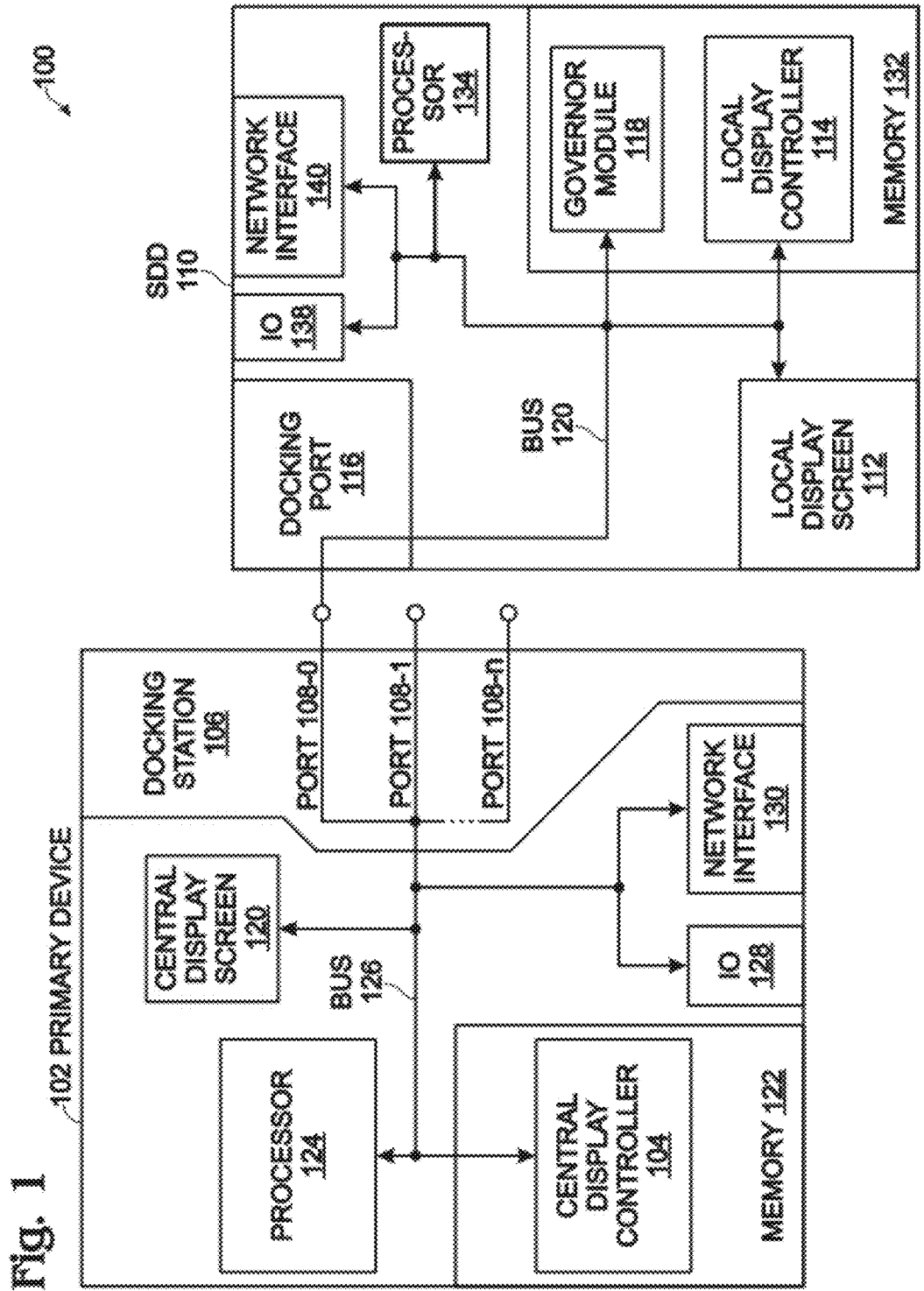

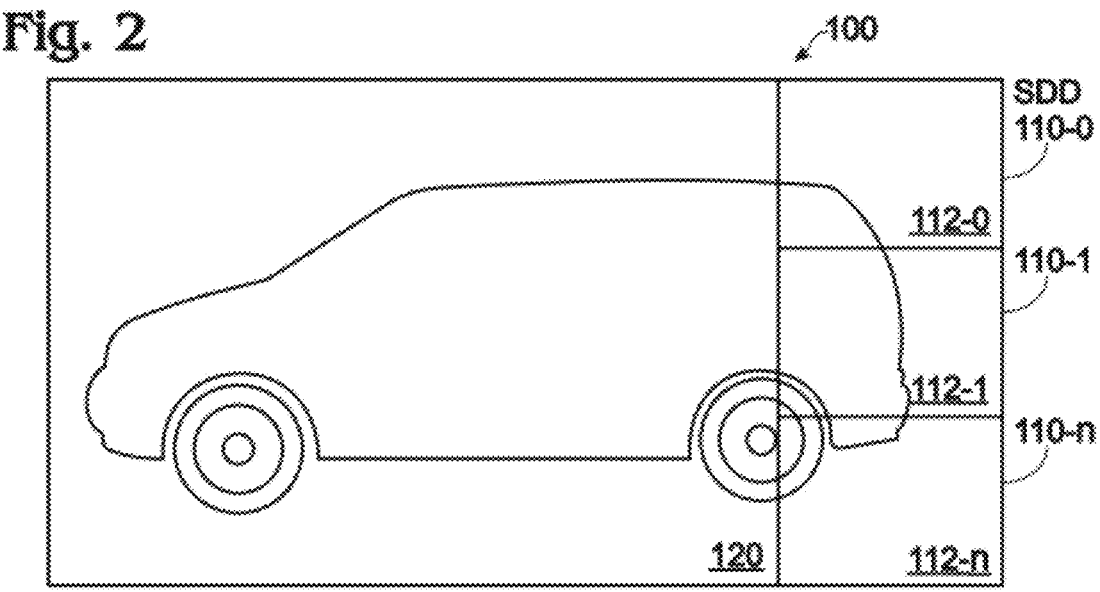
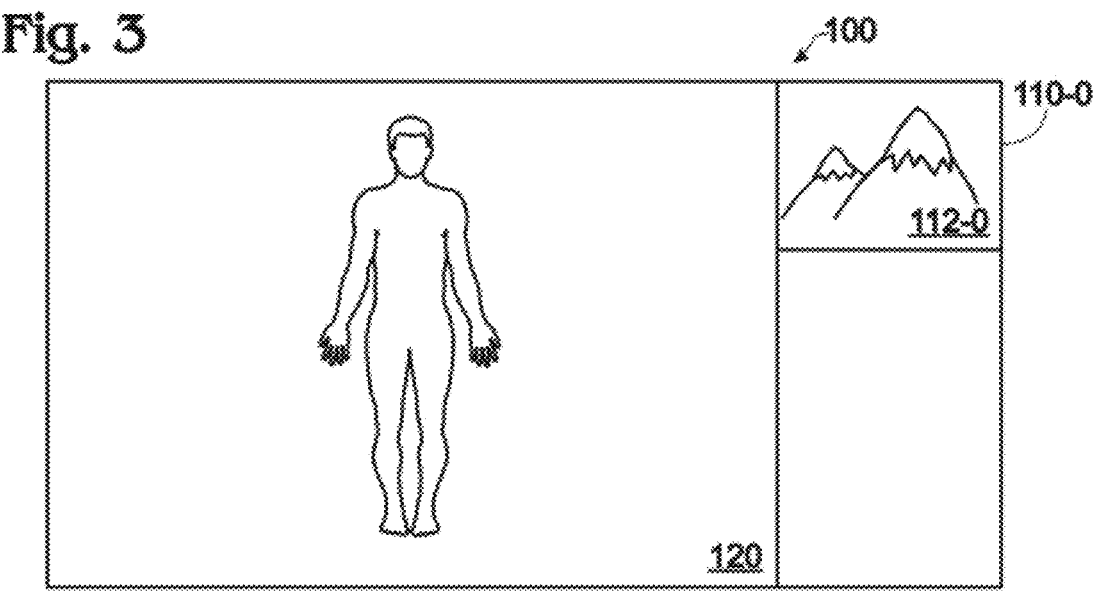

PRIMARY DISPLAY WITH SELECTIVELY AUTONOMOUS SECONDARY DISPLAY MODULES

BACKGROUND OF THE INVENTION

1. Field of the Invention

This invention generally relates to large information displays and, in particular, a display with autonomous secondary display modules for use in conference or meeting rooms.

2. Description of the Related Art

A large information display typically requires connection to a personal computer or video source for the display of information. Some examples of such a display include liquid, crystal display (LCD), organic light emitting diode (OLED), plasma panel, or digital light processing (DLP). Manipulation of the information usually requires computer peripheral devices such as pointing devices—mice, joysticks, tablets—and keyboards. In addition, for collaborative work to include remotely located individuals or groups, some form of telephony is also employed. To display real objects, often yet another piece of equipment, a document camera, is also required. Issues of compatibility and interoperability are poorly addressed as these components accumulate.

Complexity and difficulty of use increase with the number of devices, and reliability also suffers as more and more equipment is introduced. Each component has its own user interface design, which is typically inconsistent across products and vendors. Further, because these are general purpose peripheral devices, they may be removed by other parties from the locale of the information display to be used with computers elsewhere, thus crippling the capabilities of the remaining system components.

Conventionally, a conference room with a large display is outfitted with technological components by a system integrator or installer who interconnects the various devices. However, since these be from mixed vendors or include legacy components, it is difficult to maintain such systems over time, as software updates may cause unintended interactions affecting performance of components.

It would be advantageous if a large screen display could be enabled with central and secondary display sections, where the secondary display sections could be centrally controlled or optionally permitted autonomous local control.

SUMMARY OF THE INVENTION

Disclosed herein is a large screen display where the components of the display itself are integrated functional modules serve the needs of a group in a meeting setting. These modules or display sections facilitate the display and manipulation of information, telephony, and audio-visual modes of communication, and provide tools ordinarily used in business or educational meetings. The modules mechanically dock to the central display, or to a convenience dock associated with the display, where their power systems are recharged and where their function may be redefined as an aspect of the docked state.

When undocked, the secondary display module function may change to reflect specific capabilities associated with the hardware and software components of the module. For example, when docked, a secondary module may appear to be a part of the central display, with a secondary display component becoming an extension of the information display surface. However, when undocked, this secondary module may assume the function of a conference telephone, as it also contains microphones, speakers, and circuitry to enable use as a speakerphone. The display component may appear as a telephone keypad, call number index, speed dialer, etc. Working in association with the main display component, the module functions as what would normally be a completely separate technology.

Since the secondary module does not function at great distances from the main display, there is no incentive for other parties to remove the equipment from the vicinity of the display. This maintains the integrity of the services available in use of the display. The user interface and design philosophy is echoed across the variety of modules and module functionality as a common interface, so that ease of use is greatly improved over ad hoc assemblages of equipment.

Accordingly, a multi-function display is provided with selectively autonomous secondary modules. The multi-function display includes a primary device and at least one secondary display device (SDD). The primary device is made up of a central display controller for determining display functions and includes at least one docking port. Each docking port selectively connects a SDD to the primary device mechanically, and electrically connects a docked SDD to the central display controller. Each SDD includes a local display screen for presenting visual content to a viewer, and a local display controller for determining local display functions. Each SDD includes a docking port for selectively interfacing to a primary device docking port, and further includes a governor module. The governor module has an interface to determine if the SDD is docked to the primary device. The governor module permits the central display controller to determine local display functions in response to the SDD being docked with the primary device, or permits the local display controller to determine local display functions in response to the SDD not being docked. That is, if the SDD is docked with the primary device docking station, the central display controller may determine the SDD local display functions.

Additional details of the above-described multi-functional display are provided below.

BRIEF DESCRIPTION OF THE DRAWINGS

FIG. 1 is a schematic block diagram of a multi-function display with selectively autonomous secondary modules.

FIG. 2 is a schematic block diagram depicting a first function associated with the multi-function display of FIG. 1.

FIG. 3 is a schematic block diagram depicting second and third functions associated with the multi-function display of FIG. 1.

DETAILED DESCRIPTION

Figure 4:
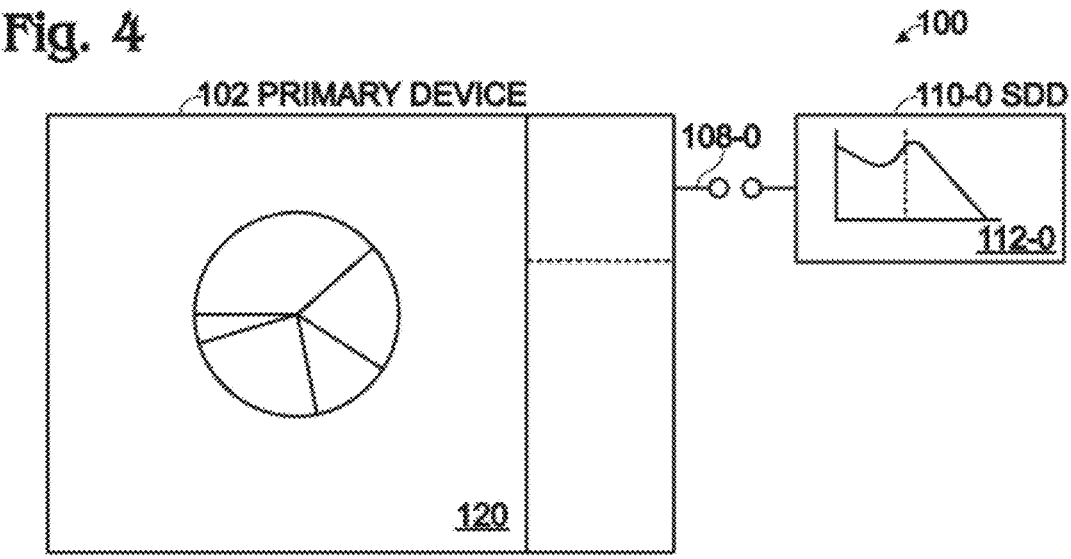
FIG. 4 is a schematic block diagram depicting a fourth function associated with the multi-function display of FIG. 1.

FIG. 1 is a schematic block diagram of a multi-function display with selectively autonomous secondary modules. The multi-function display 100 comprises a primary device 102. The primary device 102 includes a central display controller 104 for determining display functions and a docking station 106 with at least one docking port 108. Shown are docking ports 108-0 through 108-n, where n is an integer variable. Each docking port 108 selectively mechanically connects a secondary display device (SDD) 110 to the primary device 102. The docking port 108 also electrically connects a docked SDD 110 to the central display controller 104. As used herein, selectively connect means a connection that is designed for quick and easy engagement and disengagement, and also a connection that is designed to be repeatedly made and broken. In one aspect, the docking port and primary device are part of the same mechanical assembly. Alternatively, the docking ports are a separate mechanical structure connected to the central display controller via a hardwired or wireless link.

The multi-function display 100 includes at least one SDD 110. Each SDD 110 includes a local display screen 112 for presenting visual content to a viewer and a local display controller 114 for determining local display functions. A docking port 116 selectively interfaces to a primary device docking port 108. The SDD 110 also includes a governor module 118 having an interface to determine if the SDD is docked to the primary device 102. The governor module 118 permits the central display controller 104 to determine local display functions in response to the SDD being docked with the primary device 102, and permits the local display controller 114 to determine local display functions in response to the SDD not being docked. Thus, if the SDD 110 is docked with the primary device docking station 108, the SDD may be configured so that the central display controller determines the first SDD local display functions.

As used in this application, the terms "component," "module," "device," and the like may be intended to refer to an automated computing system entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The devices described herein typically employ a computer system with a bus or other communication mechanism for communicating information, and a processor coupled to the bus for processing information. The computer system may also include a main memory, such as a random access memory (RAM) or other dynamic storage device, coupled to the bus for storing information and instructions to be executed by processor. These memories may also be referred to as a computer-readable medium. The execution of the sequences of instructions contained in a computer-readable medium may cause a processor to perform some of the steps associated with display functions. Alternately, some of these functions may be performed in hardware. The practical implementation of such a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

The central display controller 104 may be enabled as a sequence of software instructions stored in the primary device local memory 122 and executed by the processor 124. The memory 122 and processor 124 may be connected via a data/address bus 126. Likewise, the e data/address bus 126 may be connected to an input/output (IO) port 128, network interface 130, and the docking port 108. Likewise, the local display controller 114 and governor module 118 of the SDD 110 may be enabled as a sequence of software instructions stored in a SDD local memory 132 and executed by the processor 134. The memory 132 and processor 134 may be connected via a data/address bus 120. Likewise, the data/address bus 120 may be connected to an IO port 138, network interface 140, and the docking port 116. In one aspect, the primary device 102 includes a central display screen 120.

FIG. 2 is a schematic block diagram depicting a first function associated with the multi-function display of FIG. 1, Typically, the primary device 102 also includes a central display screen 120 for presenting content to a viewer. In one aspect, if the SDD 110 is docked with the primary device docking station 110, the central display controller determines the first SDD local display functions and selects a distributed display function where a visual image is divided into a first portion and a second portion. Then, the central display screen 120 presents the first portion of the visual image and the SDD local display screen 112 presents the second portion of the visual image. As shown, the central display screen 120 presents the first portion and the second portion of the visual image is presented across the local display screens of SDDs 110-0 through 110-n.

FIG. 3 is a schematic block diagram depicting second and third functions associated with the multi-function display of FIG. 1. Again, the SDD 110 is docked with the primary device docking station 108. in this aspect the central display controller 104 determines the SDD local display functions and selects a multi-display function for the presentation of a first visual image and a second visual image. Then, the central display screen 120 presents the first visual image (e.g., a person) and the SDD local display screen 112 presents the second visual image (e.g., a mountain).

In an alternate aspect, the central display controller 104 relinquishes control over the SDD local display functions and selects a central display function for the presentation of a visual image. Then, the central display screen 120 presents the visual image (e.g., a person) and the SDD local controller selects a local display function, in this example, the local display function is showing a mountain in local display screen 112.

FIG. 4 is a schematic block diagram depicting a fourth function associated with the multi-function display of FIG. 1. In this aspect, the SDD 110 is undocked from the primary device docking station 108. The central display controller selects a central display function for the presentation of a visual image and the central display screen 120 presents the visual image (e.g., a pie chart). The SDD local controller selects a local display function and the local display 112 depicts a graph.

Figure 5:
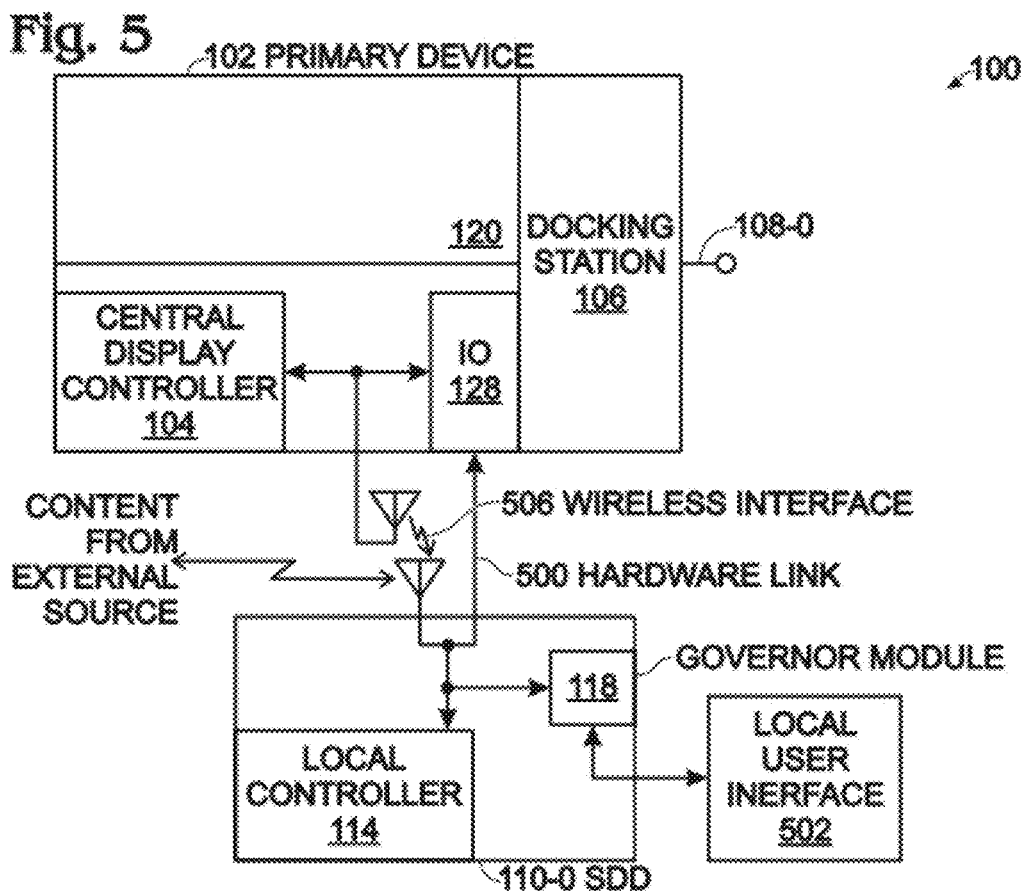
FIG. 5 is a schematic block diagram depicting a fifth function associated with the multi-function display of FIG. 1.

FIG. 5 is a schematic block diagram depicting a fifth function associated with the multi-functional display of FIG. 1. In this aspect, the primary device 102 includes a hardwired link 500. The SDD 110 transceives communications with the central display controller 104 via the hardwire link 500 when undocked from the primary device docking station 108. The SDD local controller 114 selects a display function provided by the central display controller via the hardwired link.

In one aspect, the SDD includes a local user interface (UI) 502, and the SDD governor module enables communications between the local user interface 502 and the central display controller via the hardwired link 500. For example, the local UI 502 may be an earphone jack, touchscreen, digital scratch pad, CD/DVD/BlueRay drive, microphone, memory card reader, or Bluetooth interface.

In another variation, the primary device 102 has a wireless interface 506 such as a WiFi, wireless universal serial bus (USB), near field communication (NFC), or infrared data association (IrDA), and the SDD 110 has the same wireless interface 506, The SDD local controller 114 is able to select a display function provided by the central display controller via the wireless interface 506. Alternatively, the SDD governor module may enable communications between the local user interface 502 and the central display controller 104 via the wireless interface 506 or hardwire link 500. In one aspect, the primary device includes a television receiver, and television content is distributed to the SDD via either the hardwire line or wireless interface. In another aspect, the SDD governor module enables communications between the local user interface 502 and the central display controller via the wireless interface 506.

In another aspect, the SDD 110 has a wireless interface 504, such as a broadcast television receiver, WiFi, wireless universal serial bus (USB), near field communication (NFC), or infrared data association (IrDA), in this aspect, the SDD local controller 114 is able to select a local display function with content provided via the wireless interface. That is, the content need not necessarily be provided by the primary device. Likewise, SDD local controller 114 may be able to select a local display function with content provided via a hardwired link that is not connected to the primary device.

In one aspect, the SDD local user interface 502 accepts a display default override command. In this mode, even if the SDD governor module 118 determines that the SDD is not docked to the primary device 102, it permits the central display controller to determine local display functions in response to the display default override command. Alternatively, if the SDD governor module 118 determines that the SDD is docked to the primary device 102, it may permit the local display controller 114 to determine local display functions in response to the display default override command.

Figure 6A:
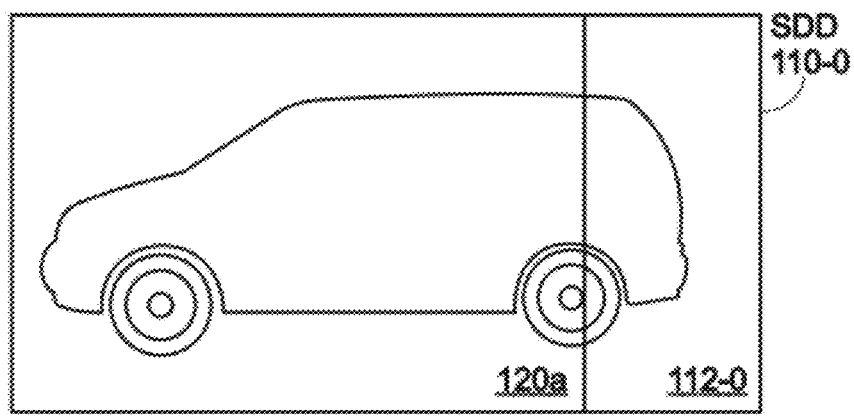
FIGS. 6A through 6C are schematic block diagrams depicting the multi-function display with a tertiary display section.
Figure 6B:
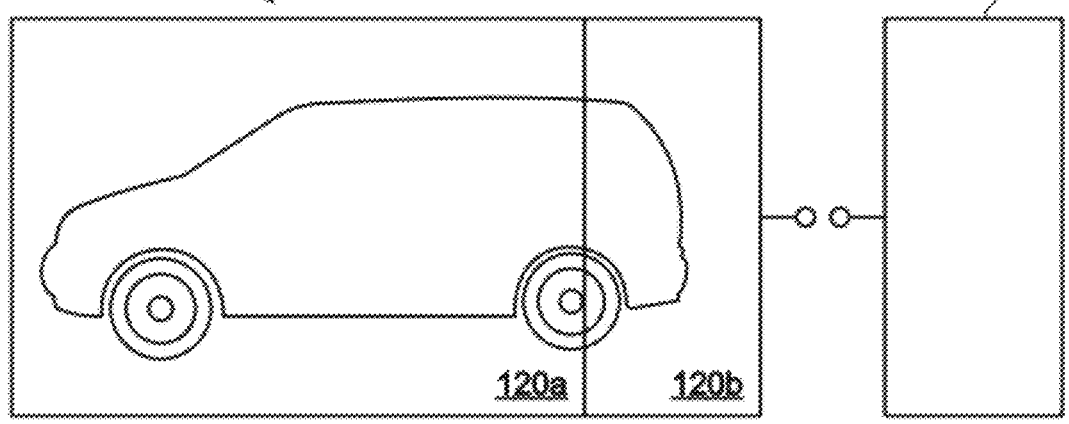
Figure 6C:
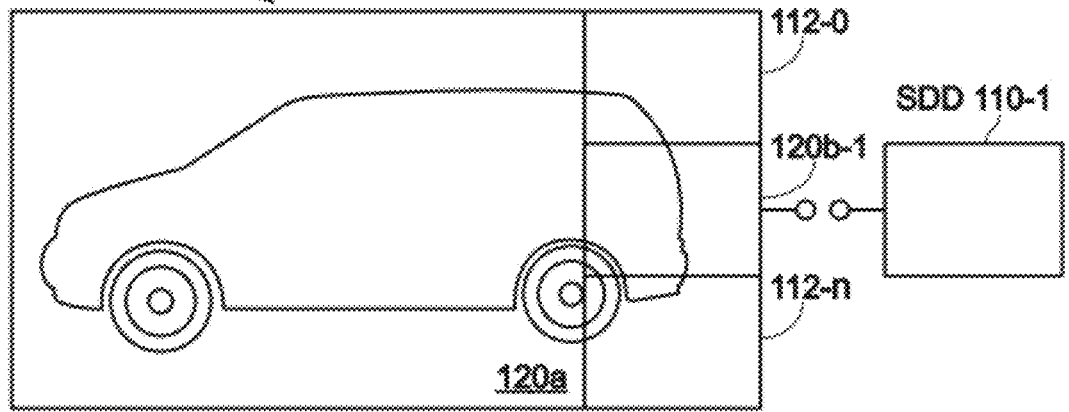

FIGS. 6A through 6C are schematic block diagrams depicting the multi-function display with a tertiary display section, in this aspect, the primary display screen 120 includes a permanent display section 120a and a tertiary display section 120b underlying the SDD 110, when the SDD is connected to the docking port 108. For example, the central display controller may select a distributed display function where a visual image is divided into a first portion and a second portion. The central display controller presents the first portion of the visual image on the permanent display section. In FIG. 6A the SDD local display screen 112 presents the second portion of the visual image when connected to the docking port 108. When the SDD 110 is disconnected from the docking port (FIG. 6B), the central display controller 104 presents the second portion of the visual image on the tertiary display section 120b. In FIG. 6C, two SDDs are docked and one SDD is undocked, so that the second portion of the visual image is partially depicted on the docked SDDs and partially depicted on the tertiary display section 120b-1.

Figure 7A:
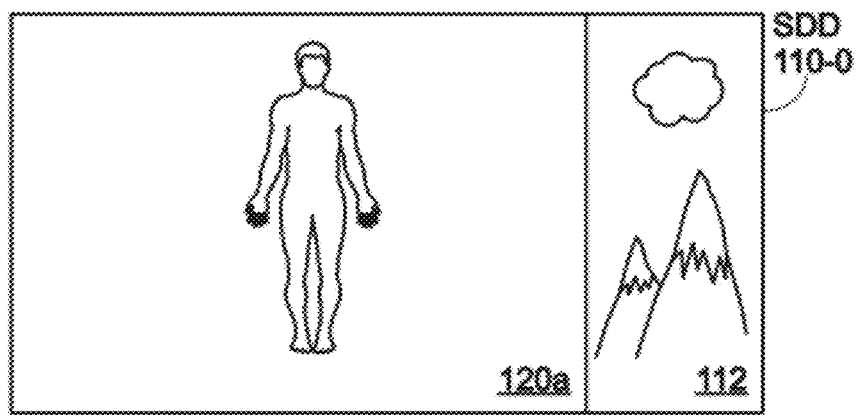
FIGS. 7A through 7C are schematic block diagrams depicting the tertiary display section enabling a multi-display function.
Figure 7B:
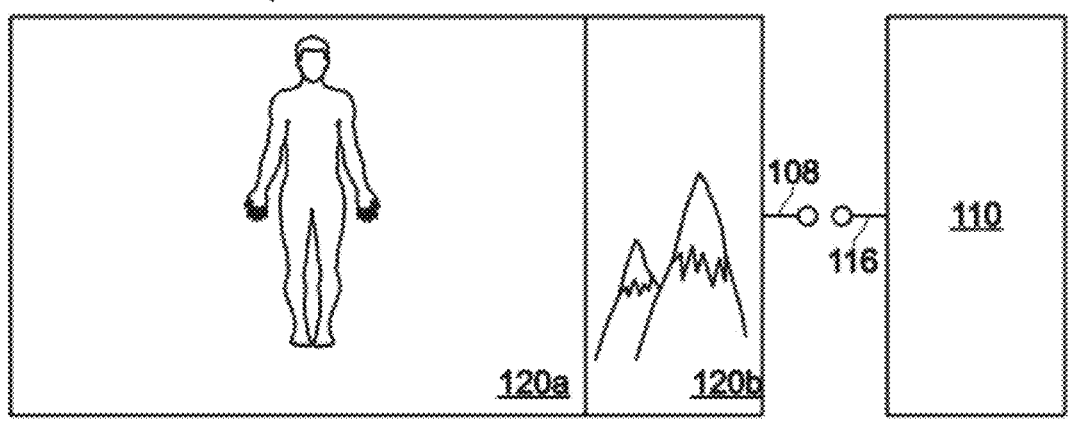
Figure 7C:
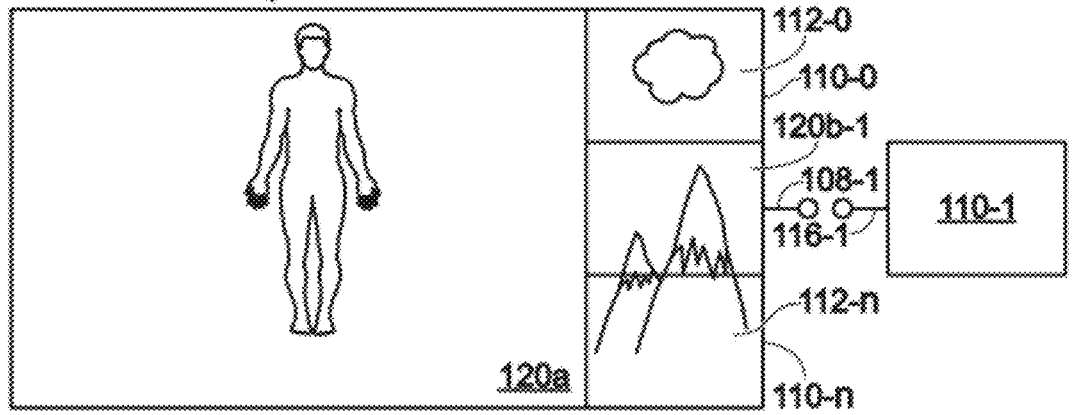

FIGS. 7A through 7C are schematic block diagrams depicting the tertiary display section enabling a multi-display function. In this aspect the central display controller 104 selects the multi-display function for the presentation of a first visual image and a second visual image. The central display controller presents the first visual image on the permanent display section 120a. The SDD local display screen 112 presents the second visual image when connected to the docking port 108 (FIG. 7A). The central display controller presents the second visual image on the tertiary display section 120b when the SDD 110 is disconnected from the docking port 108. In FIG. 7C, two SDDs are docked and one SDD is undocked, so that portions of the second visual image are presented in the local display screens of the docked SDDs, and the central display controller presents a portion of the second visual image on the tertiary display section 120b.

Functional Description

The multi-function display described above has display components that are capable of being functionally reassigned while mechanically integrated with the display. The display components may automatically reassign their functionality when mechanically or logically separated from the central display. The plurality of individual display-capable SDD components has a variety of functionality dependent upon physical and logical arrangement.

The multi-function display comprises a primary display having a computational engine, a graphical display controller, memory, a power supply, wired and wireless data communication modules, an included or a separately connected docking apparatus which accommodates one or a specific number of secondary display devices, and a control program. At least one secondary display device has a less powerful computational engine, a graphical display controller, memory, a rechargeable power source, a wireless data communication module, and specialty components for interaction and utility, such as a touch panel surface, an IO port, a pen-tracking device, a camera module, or a printing module, and a control program.

When docked, the central control program is made aware of the presence and position of the secondary display devices and issues instructions to the secondary display devices based on the identification of the secondary display device and current activity state of the primary display.

Figure 8:
FIG. 8 is a diagram depicting an exemplary use of the multi-function display.

FIG. 8 is a diagram depicting an exemplary use of the multi-function display. Since the secondary devices 110 have local intelligence, an instruction may simply direct the secondary display to acquire and display data from other sources. For example, the uppermost SDD 110-0 may acquire the correct time from a time standard source, adjust for local time zone, and become a virtual clock. The next lower SDD 110-1 may be instructed to become a scratch pad, and a reminder message may be created on it by writing with a fingertip and the image remains on display. The third from top SDD 110-2 is assigned to monitor data sources related to prices of financial instruments and display these. The fourth and lowermost SDD 110-*n* acquires data from an RSS news feed and displays these messages as they are received. Alternatively as shown in FIG. 2, in a different primary display use condition, the same SDDs may instead be instructed to receive data from the primary display controller and to function as a single, larger display surface or "display wall".

Figure 9:
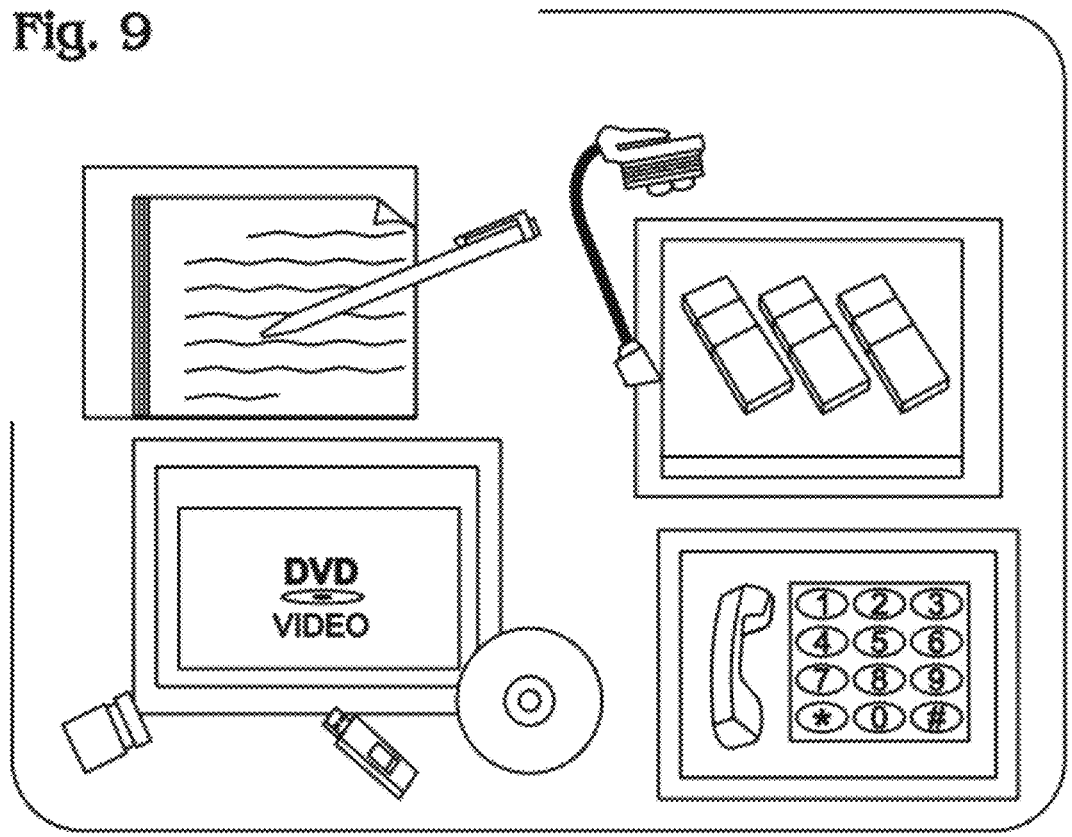
FIG. 9 is a diagram depicting exemplary SDD functions.

FIG. 9 is a diagram depicting exemplary SDD functions. When an SDD is removed from the docked condition, this change is noted by both the SDD and the primary device. The primary display control program. may alter the instructions provided to the SDD, or a user is able to initiate a new function by direct interaction with the SDD. In the undocked condition, the SDD is not restricted by the mechanical. envelope of the docking apparatus and the user may now have access to a variety of mechanisms on the edges or back of the device. This may include, among many options, an folding support arm with camera assembly, a touch stylus in a storage compartment a gaming device controller, a media insertion slot and reader for optically read media, sockets for electrically read media, printing module, a small tertiary touch display panel, etc.

In the undocked condition, the SDD control program and user interaction may redefine the function and usage of the SDD. For example, in the case of the camera with support arm, the SDD may assume the functionality of a digital presentation device. Objects or documents placed in the view of the camera may be directed to appear on the primary display, while the secondary display functions as a touch control panel. Or, an electronic presentation file may be viewed by software on the primary device and SDD in a variety of ways, such as a presentation window on the primary display and a presenter window with notes viewing and slide previewing on the secondary display.

Similarly other undocked condition SDDs may assume functions based on their provided hardware capability and the control interaction in context with the primary display. Depending on the scope of the function and SDD resources, some of the functionality may depend on data manipulation and processing by the computing engine and controller of the primary display. This partitioning of data processing may be dynamically determined by the control programs of both the SDD and the primary device.

The docking station need not be physical connected as previously shown, or may include an expansion station which is remotely connnected, allowing additional SDDs to be used beyond the available docking station capacity.

Some functions, such as audio and video capture, may be included as components of the primary display even if also available in a secondary display. In the docked state an SDD offering video and audio capture may not have full access to the inputs due to mechanical restrictions, or a user may elect not to include such a device in the assemblage, but may still desire audio and video capture for meeting recording, voice and videoconferencing, and the like.

Figure 10:
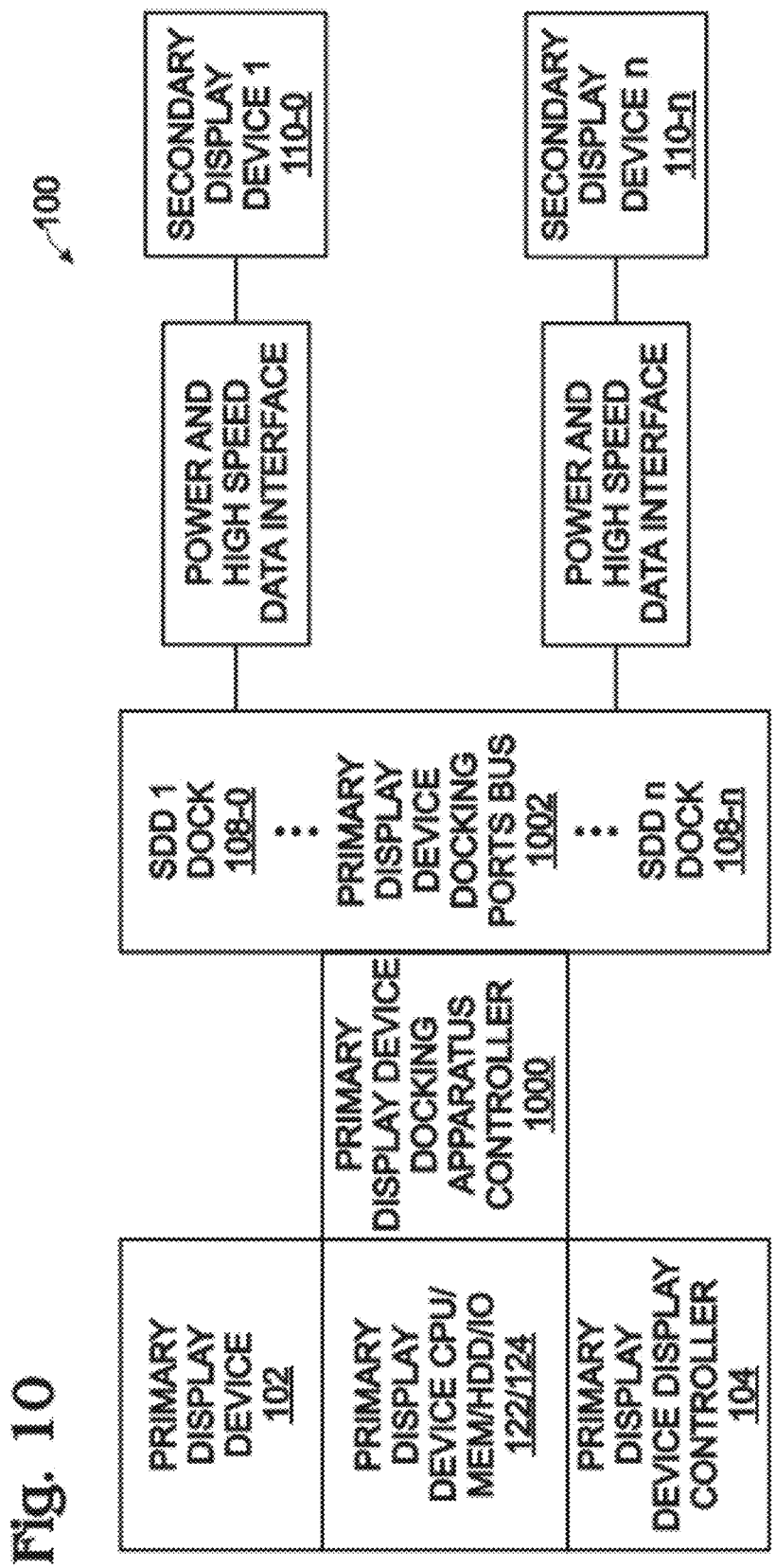
FIG. 10 is a schematic diagram depicting the multi-function display from a different perspective.

FIG. 10 is a schematic diagram depicting the multi-function display from a different perspective. For simplicity, only two SDDs are diagrammed, but a plurality of SDDs is possible. SDDs include components functionally equivalent to primary device memory/CPU and controller, although typically of lower power in both an electrical and computer processing sense. SDD 110-0 is mechanically docked at location 108-0, which provides electrical interconnection for DC or AC power and for a high performance, bidirectional data communications pathway. When connected, SDD 110-0 is identified by one or more means including: active sensing of the power storage unit in SDD 110-0 through the power wiring, electrical triggering signals associated with the data interface, data sensing of the data status associated with the docking ports bus as analyzed by controller 104, or active monitoring of electromagnetic or mechanical switches or sensors associated with both docking port 108-0 and SDD 110-0.

In a default configuration, assuming all available docking ports on docking bus are occupied, logic executing on the primary device computing engine 124 uniquely prepares data to be displayed on the SDDs 110-0 and 110-*n* with controller 104, and through docking controller 1000, bus 1002, and interfaces 108-0 and 108-*n*.

In the undocked condition, data communication between the primary device and SDD occurs over wireless or alternative wired, network components. Logic on the primary device establishes that the SDD is in the undocked condition by verifying it is not docked using the docking tests mentioned above, and by data sensing on the network components to establish the active presence of the undocked SDD.

Figure 11:
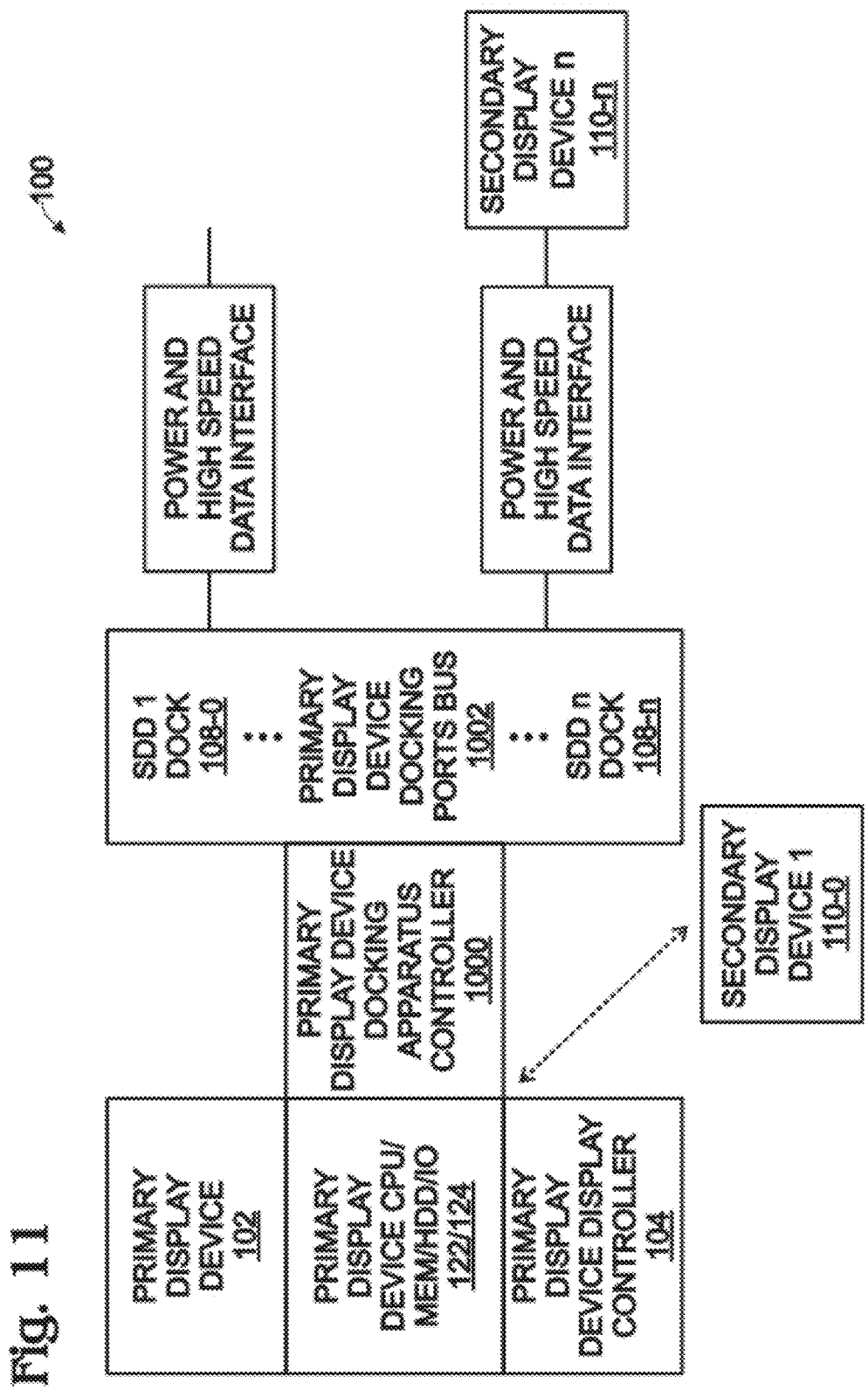
FIG. 11 is a schematic diagram depicting the multi-function display of FIG. 10 with an undocked SDD.
Figure 12A:
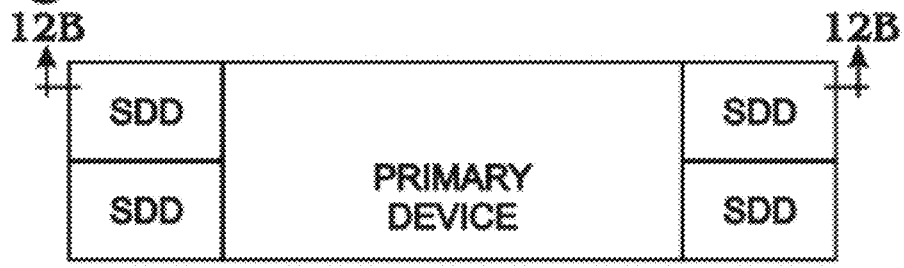
FIGS. 12A through 12D depict exemplary mechanical interfaces between the primary device and the SDDs.
Figure 12B:
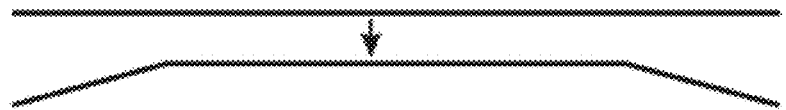
Figure 12C:
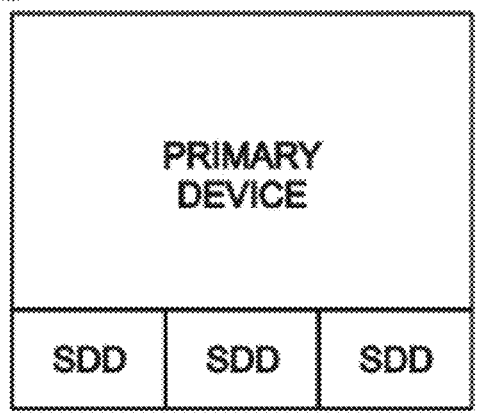
Figure 12D:
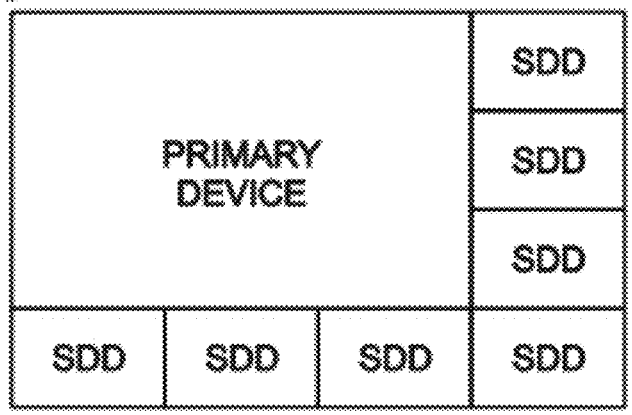

FIG. 11 is a schematic diagram depicting the multi-function display of FIG. 10 with an undocked SDD. With a known depopulated docking apparatus, logic on the primary device alters behavior towards the remaining docked SDDs. This can be as simple as requesting docked devices to power off or enter a non-displaying sleep mode, if no utilization is desired. Alternatively, a docked SDD can be active in a non-displaying compute engine mode, where the primary device uses computing capability available in the SDD to augment performance of its own computing tasks. Content to be displayed is re-factored to occupy the primary display alone, with either scaling, or scaling with layout modifications, as part of the re-factoring decision.

SDD 110-0 may also programmed to detect its docking condition, either by internal sensing similar to that described previously, or by data communication of status from the primary device 102. Additionally, hardware featuring of SDD 110-0 may also permit a forced logical undocked-equivalent status condition, to utilize some feature of the undocked SDD functionality. For example, SDD 110-0 may include circuitry to function as a digital television receiver, and easily accessed touch controls appear. In the physically docked condition, it may be desired to use this function in the normal undocked manner to select viewable content, and then have the receiver functionality continue with the SDD display reverting to the expected docked condition behavior, e.g., as an expansion of the displayable area.

In one aspect, the undocked SDD 110-0 executes logic which alters its behavior to become a special purpose device, serving one or more simple accessory functions. Continuing the example of a DTV receiver, SDD 110-0 may behave as an intelligent remote control, capable of displaying selected content on the primary device, while also showing alternative content in a control panel, providing a local audio speaker or headphone connectivity, and directing DVR processing to internal or external storage media.

FIGS. 12A through 12D depict exemplary mechanical interfaces between the primary device and the SDDs. Mechanically, the docking apparatus may be hinged or otherwise adjustable to allow the SDDs to be non-coplanar with the primary device display. The docking apparatus may be along any edge of the primary device, or more than one edge, and may support more than a single size or aspect ratio SDD, allowing for SDD display area to vary depending on other desired functionality.

Docking status may be determined by repetitive polling of dock locations and sensors. When a docking condition is established for the system, e.g. all docked, then logic can query a preferences setting to determine subsequent action, such as utilizing all displays as a single contiguous surface.

In an alternative aspect, the primary device is only a primary device, having all of the previously described components—computing engine, networking, docking apparatus, etc.—but without a display component. In this case, the primary device exists only in a logical sense and the full display surface area is only present when all SDDs are docked. Thus, the primary device provides a mechanical assembly area for a group of SDDs, which, when fully populating the assembly, can function in the manner of a display wall as a contiguous addressable display. In this instance, the primary device may also include the capability to orthogonally rotate the docking configuration allow a landscape or portrait assemblage of the SDDs. Depending on the aspect ratio of the SDDs utilized, and sizes, since all SDDs need not be the same physical size, other assemblage geometries such as a square or nearly square arrangement are possible.

In an alternative aspect, the primary device uses a projection-based display surface in place of an emissive or self-illuminated display such as plasma, LCD, OLED, and similar display technologies in this case, the remainder of the multi-function display components (dock, SDDs, etc.) are present and function in the same manner. The projection display surface may either be a front-projection image receiving surface, such as a screen material or whiteboard, or a rear projection screen receiving imagery from behind. This implementation is functionally equivalent to panel displays, but a front projection central display may incorporate a wired or wireless connection from the display controller to the projection device. For a rear projection central display, a different envelope geometry is used to accommodate a greater depth central display, but otherwise is functionally equivalent.

In an alternative aspect, see FIGS. 6A-6C and 7A-7C, when SDDs are undocked, they reveal the surface of another display, a Tertiary Display Device (TDD) or tertiary display section behind their docking locations. This may be either a region of a single contiguous display located behind the modules, or discrete displays positioned as the SDDs would be. Discrete TDDs may be mechanically mounted with sprung, articulated mounts, so they move forward to retain the approximate planarity of the original configuration of the docked SDD. Upon undocking, the primary device and its associated controllers assume responsibility to continue the functional actions of the removed SDD the same region of displayed surface, and cause this region of display to behave similarly to the undocked SDD previously occupying the region.

Special preferences may be set to determine the actual behavior of the region under some context condition. For example, to allow alternative behavior such as simply being an extended display area of the central display, or if a reassembly condition is declared, the primary device controller may indicate which SDD should be re-docked at the location of, or on, a TDD. Similarly if an SDD is being utilized to display a critical content component, but its capability for some optimized task in the undocked state is desired, removal to that end does not terminate the display of critical content. While performance of some other attribute of behavior may be compromised without the contributed computational power of the SDD, the primary device and associated controllers can backfill functionality, and the TDD guarantees continued visibility of the content.

Figure 13A:
FIGS. 13A and 13B depict an exemplary use of a tertiary display section.
Figure 13B:

FIGS. 13A and 13B depict an exemplary use of a tertiary ltd display section. In FIG. 13A an individual SDD 110-0 is removed for remote use, the TDD 120b-0 "backfills" the previous functionality for continuity on the multi-function display. When the "clock" SDD 110-0 is taken away to become a "speakerphone", the primary device restores a "clock" on the TDD 120b-0. The primary device may also modify the displayed content to indicate it is appearing on a TDD, or due to display characteristic differences it may not have identical appearance, and may only be comparable in function.

Figure 14:
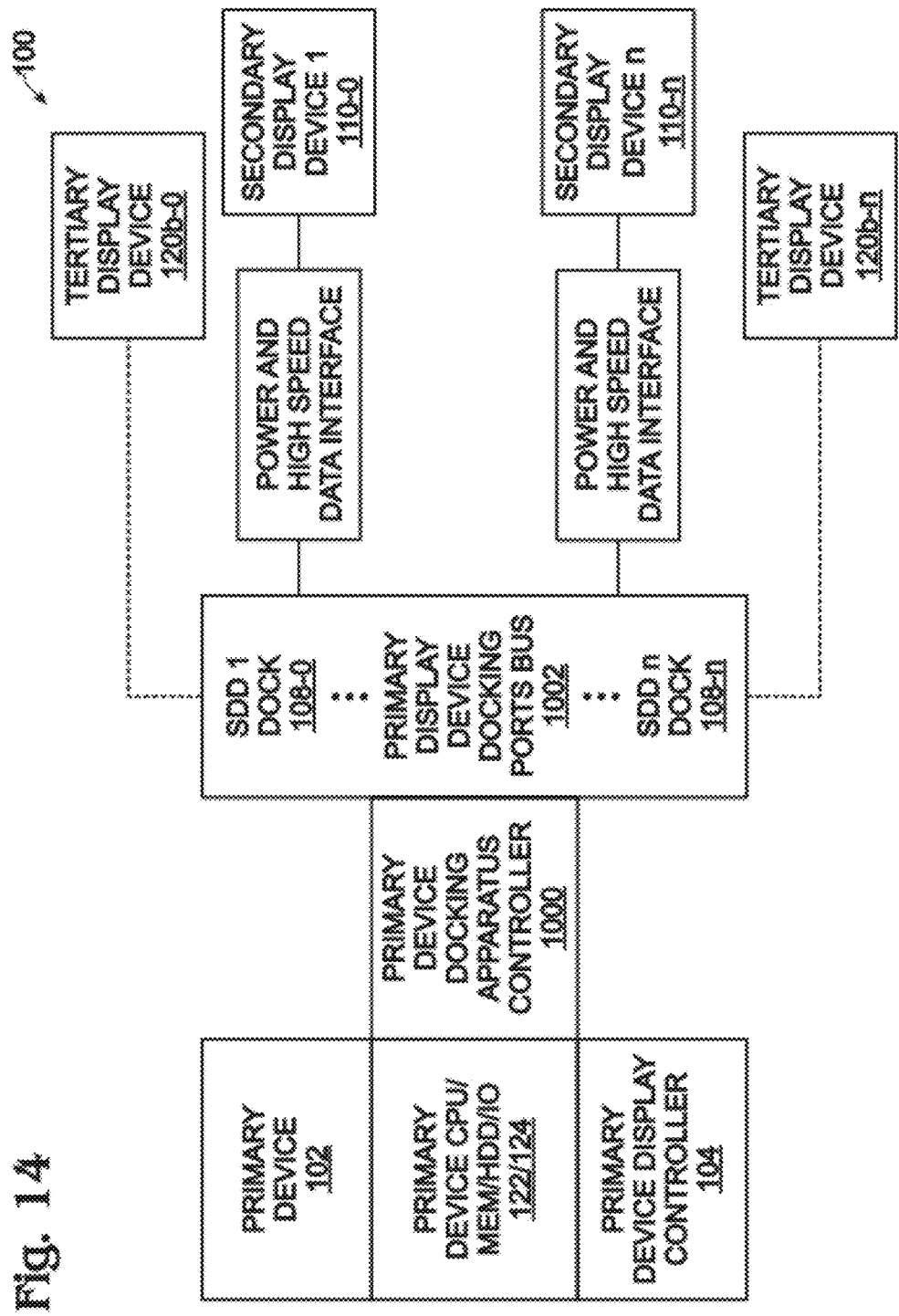
FIG. 14 is a schematic depiction of the multi-function display with tertiary display sections.

FIG. 14 is a schematic depiction of the multi-function display with tertiary display sections. The addition of one or tore TDDs simply extends the docking concept in a virtualized manner, in that the TDD(s) may be logically treated as permanently docked. SDDs, where, for a single display, a display controller partitions the displayable area into sub-regions for presentation of the emulated function content, or primary device messages, etc. For multiple TDDs, the extension is physically in the manner of SDDs, where each TDD includes controlling hardware, and where the primary device may utilize TDD processing where possible to execute the SDD function.

With respect to the interconnections between the primary device and SDDs, there are 2 functional domains: 1) data communications, and 2) power for operation and/or battery charging. Some wired connections, such as USB, provide both capabilities, although it is not well suited to heavy duty charging, such as for tablet devices. Newer wired interfaces such as Thunderbolt have increased the power limits. There are wireless power distribution methods available as well.

There are 2 functional states for an SDD—docked and undocked, where the state influences the device behavior, but there isn't necessarily a direct mapping to both interconnection domains. A wireless data communication channel can be active in either SDD state. Power available to the SDD is implicit for the docked state. Undocked, power is either from internal (e.g. battery) or external (e.g. adapter module) sources.

SDD states are automatic and default-driven. They can be overridden manually—e.g., forcing undocked SDDs to show tiled regions of a larger single image—as they might do when docked. Also, it is possible to tether a set of SDDs, where, for example, the SDDs are arrayed around a centerpiece on the conference table, and can be undocked and utilized on a cable just as in other configurations.

A multi-function display has been provided. Examples of particular mechanical layouts and electrical interfaces have been presented to illustrate the invention. However, the invention is not limited to merely these examples. Other variations and embodiments of the invention will occur to those skilled in the art.

I claim:

1. A multi-function display with selectively autonomous secondary modules, the multi-function display comprising:
a primary device including:
a central display controller for determining display functions;
a docking station with a plurality of docking ports, each docking port selectively connecting a secondary display device (SDD) to the primary device mechanically, and electrically connecting a docked SDD to the central display controller;
a plurality of SDDs, each SDD including:

a local display screen panel for presenting visual content to a viewer;
a local display controller for determining local display functions;
a docking port selectively interfacing to a primary device docking port; and,
a governor module having an interface to determine if the SDD is docked to the primary device, the governor module permitting the central display controller to determine local display functions in response to the SDD being docked with the primary device, and permitting the local display controller to determine local display functions in response to the SDD not being docked.

2. The multi-function display of claim 1 wherein a first SDD is docked with the primary device docking station; and,
wherein the central display controller determines the first SDD local display functions.

3. The multi-function display of claim 1 wherein the primary device includes a central display screen panel for presenting content to a viewer.

4. The multi-function display of claim 1 wherein the primary device includes a hardwired link;
wherein the first SDD includes a hardwired link for transceiving communications with the central display controller when undocked from the primary device docking station; and,
wherein the first SDD local controller selects a display function provided by the central display controller via the hardwired link.

5. The multi-function display of claim 1 wherein the first SDD has a wireless interface selected from a group consisting of a broadcast television receiver, WiFi, wireless universal serial bus (USB), near field communication (NFC), and infrared data association (IrDA); and,
wherein the first SDD local controller selects a local display function with content provided via the wireless interface.

6. The multi-function display of claim 1 wherein the primary device has a wireless interface selected from a group consisting of WiFi, wireless USB, NFC, and IrDA;
wherein the first SDD has the selected wireless interface; and,
wherein the first SDD local controller selects a display function provided by the central display controller via the selected wireless interface.

7. The multi-function display of claim 1 wherein the primary device further comprises:
a central display screen panel including:
a permanent display section panel; and,
a tertiary display section panel adjacent to the permanent display section panel, and underlying the SDD, when the SDD is connected to the docking port.

8. The multi-functional display of claim 1 wherein the first SDD includes a local user interface to accept a display default override command; and,
wherein the first SDD governor module determines that the first SDD is not docked to the primary device, but permits the central display controller to determine local display functions in response to the display default override command.

9. The multi-functional display of claim 1 wherein the first SDD includes a local user interface to accept a display default override command; and,
wherein the first SDD governor module determines that the first SDD is docked to the primary device, but permits the local display controller to determine local display functions in response to the display default override command.

10. The multi-function display of claim 3 wherein a first SDD is docked with the primary device docking station;
wherein the central display controller determines the first SDD local display functions and selects a distributed display function where a visual image is divided into a first portion and a second portion;
wherein the central display screen panel presents the first portion of the visual image; and,
wherein the first SDD local display screen panel presents the second portion of the visual image.

11. The multi-function display of claim 3 wherein a first SDD is docked with the primary device docking station;
wherein the central display controller determines the first SDD local display functions and selects a multi-display function for the presentation of a first visual image and a second visual image;
wherein the central display screen panel presents the first visual image; and,
wherein the first SDD local display screen panel presents the second visual image.

12. The multi-function display of claim 3 wherein a first SDD is docked with the primary device docking station;
wherein the central display controller relinquishes control over the first SDD local display functions and selects a central display function for the presentation of a visual image;
wherein the central display screen panel presents the visual image; and,
wherein the first SDD local controller selects a local display function.

13. The multi-function display of claim 3 wherein a first SDD is undocked from the primary device docking station;
wherein the central display controller selects a central display function for the presentation of a visual image;
wherein the central display screen panel presents the visual image; and,
wherein the first SDD local controller selects a local display function.

14. The multi-function display of claim 4 wherein the first SDD includes a local user interface (UI), the first SDD governor module enabling communications between the local user interface and the central display controller via the hardwired link.

15. The multi-function display of claim 6 wherein the first SDD includes a local UI, the first SDD governor module enabling communications between the local user interface and the central display controller via the selected wireless interface.

16. The multi-function display of claim 7 wherein the central display controller selects a distributed display function where a visual image is divided into a first portion and a second portion;
wherein the central display controller presents the first portion of the visual image on the permanent display section panel;
wherein the SDD local display screen panel presents the second portion of the visual image when connected to the docking port; and,
wherein the central display controller presents the second portion of the visual image on the tertiary display section panel when the SDD is disconnected from the locking port.

17. The multi-function display of claim 7 wherein the central display controller selects a multi-display function for the presentation of a first visual image and a second visual image;
- wherein the central display controller presents the first visual image on the permanent display section panel;
- wherein the SDD local display screen panel presents the second visual image when connected to the docking port; and,
- wherein the central display controller presents the second visual image on the tertiary display section panel when the SDD is disconnected from the docking port.

18. The multi-function display of claim 14 wherein the first SDD local UI is selected from a group consisting of an earphone jack, touchscreen, digital scratch pad, CD/DVD/BlueRay drive, microphone, memory card reader, camera, and Bluetooth interface.

19. The multi-function display of claim 15 wherein the first SDD local UI is selected from a group consisting of an earphone jack, touchscreen, digital scratch pad, CD/DVD/BlueRay drive, microphone, memory card reader, camera, and Bluetooth interface.

20. A multi-function display with selectively autonomous secondary modules, the multi-function display comprising:
- a primary device including:
  - a central display controller for determining display functions;
  - a docking station with at least one docking port, each docking port selectively connecting a secondary display device (SDD) to the primary device mechanically, and electrically connecting a docked SDD to the central display controller;
- a permanent display section panel; and,
- a tertiary display section panel adjacent to the permanent display section panel, and underlying the SDD, when the SDD is connected to the docking port;
- at least one SDD, each SDD including:
  - a local display screen panel for presenting visual content to a viewer;
  - a local display controller for determining local display functions;
  - a docking port selectively interfacing to a primary device docking port; and,
  - a governor module having an interface to determine if the SDD is docked to the primary device, the governor module permitting the central display controller to determine local display functions in response to the SDD being docked with the primary device, and permitting the local display controller to determine local display functions in response to the SDD not being docked.

21. A multi-function display with selectively autonomous secondary modules, the multi-function display comprising:
- a primary device including:
  - a central display controller for determining display functions;
  - a docking station with a plurality of docking ports, each docking port selectively connecting a secondary display device (SDD) to the primary device mechanically, and electrically connecting a docked SDD to the central display controller; and,
- wherein the central display controller determines if docked SDDs are permitted control over their local display functions.

22. The multi-function display of claim 21 further comprising:
- a plurality of SDDs, each SDD including:
  - a local display screen panel for presenting visual content to a viewer;
  - a local display controller for determining local display functions;
  - a docking port selectively interfacing to a primary device docking port; and,
  - a governor module having an interface to determine if the SDD is docked to the primary device, the governor module permitting the central display controller to determine local display functions in response to the SDD being docked with the primary device, and permitting the local display controller to determine local display functions in response to the SDD not being docked.

23. The multi-function display of claim 21 wherein the primary device further comprises:
- a central display screen panel including:
  - a permanent display section panel; and,
  - a tertiary display section panel adjacent to the permanent display section panel, and underlying the SDD, when the SDD is connected to the docking port.

* * * * *